June 14, 1938.  R. E. BITNER  2,120,916
LIGHT FREQUENCY CONVERTER
Filed Sept. 22, 1934  3 Sheets-Sheet 1
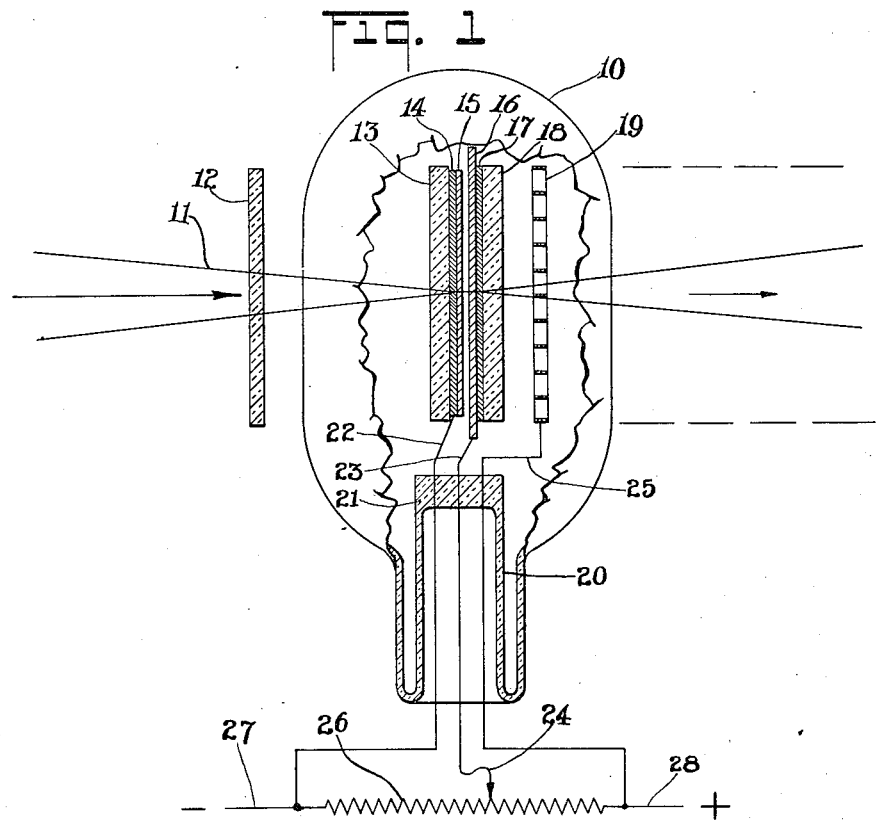
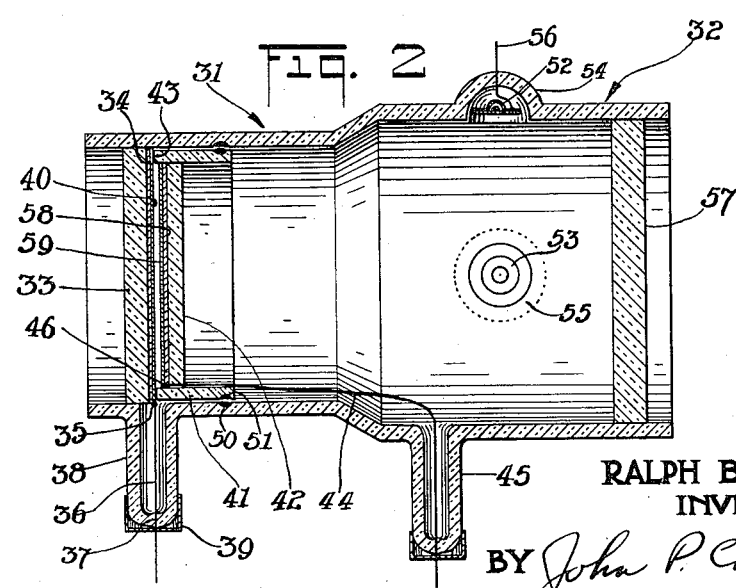
RALPH BITNER
INVENTOR
BY John P. Chandler
HIS ATTORNEY.

June 14, 1938.  R. E. BITNER  2,120,916
LIGHT FREQUENCY CONVERTER
Filed Sept. 22, 1934   3 Sheets-Sheet 2
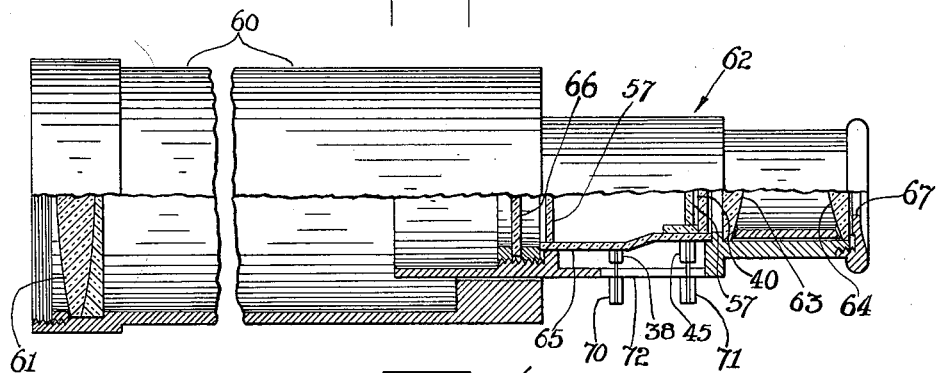
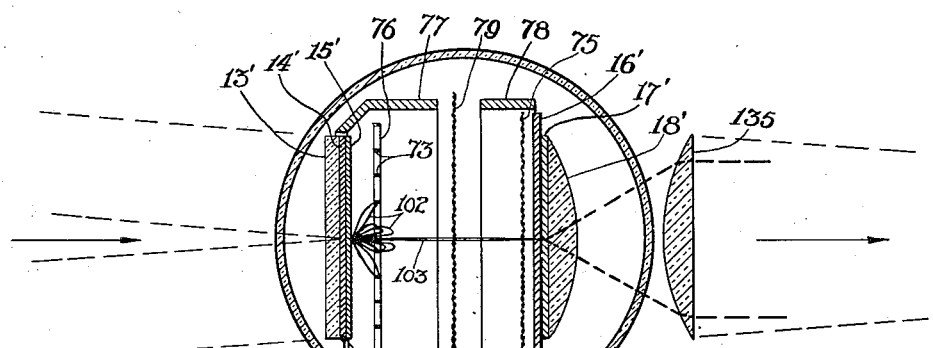
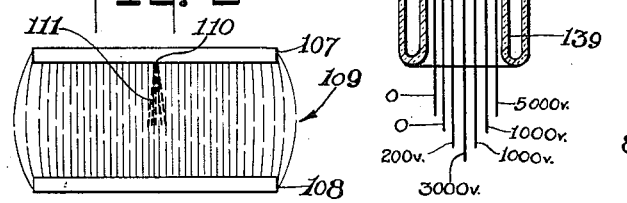
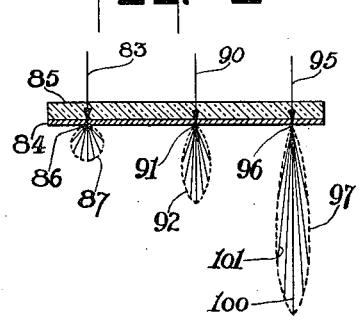
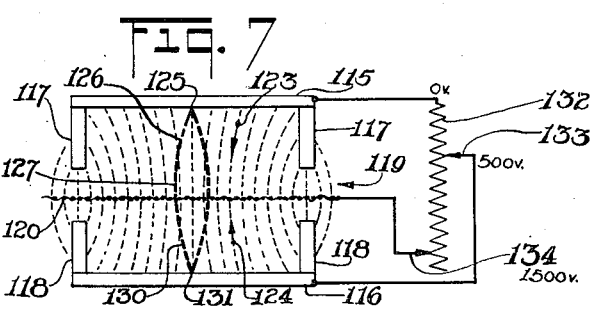
RALPH BITNER
INVENTOR
BY John P. Chandler
HIS ATTORNEY.

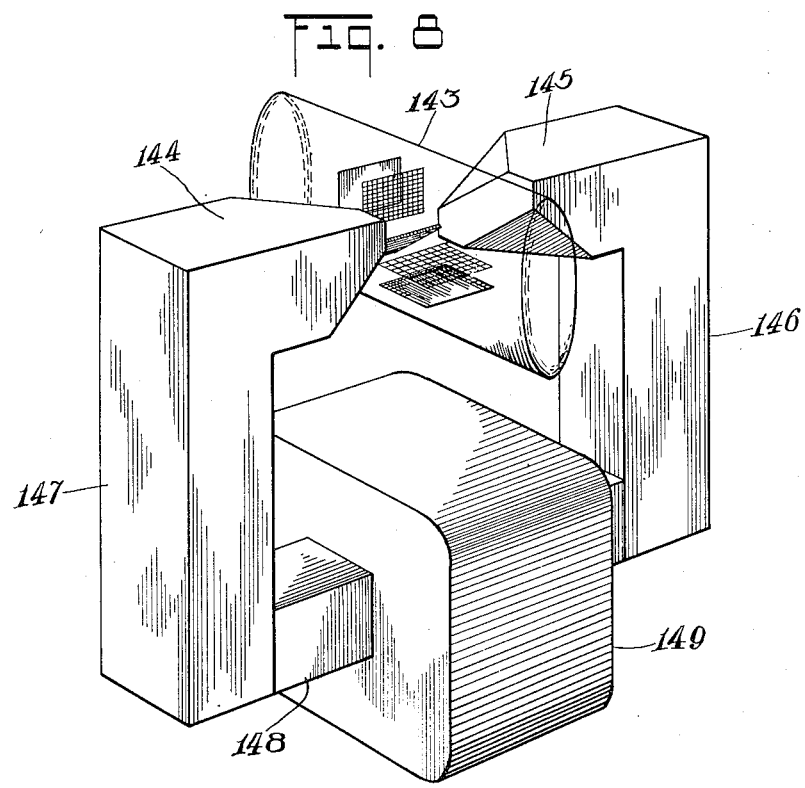
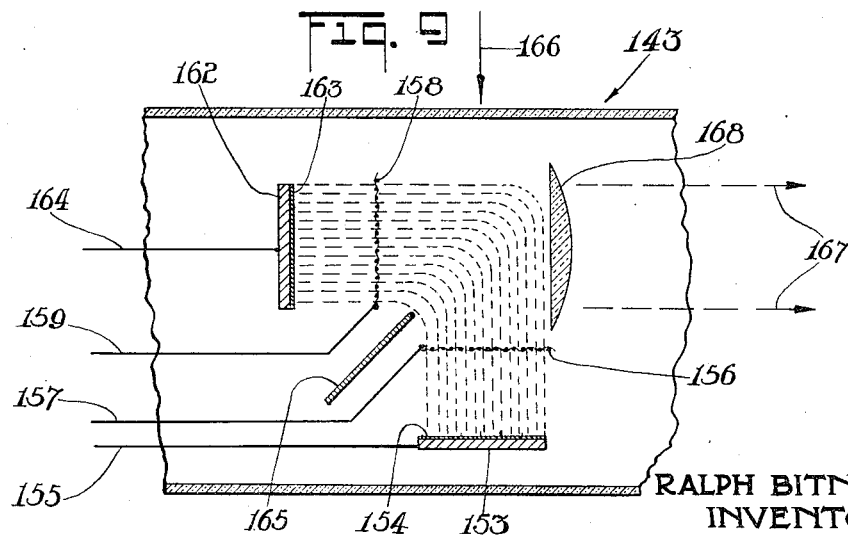

Patented June 14, 1938

2,120,916

UNITED STATES PATENT OFFICE 2,120,916

LIGHT FREQUENCY CONVERTER

Ralph E. Bitner, Flushing, N. Y.

Application September 22, 1934, Serial No. 745,028

7 Claims. (Cl. 250—27.5)

This invention relates to electronic devices having visible indicators to show the movements and intensities of electron streams which are controlled by light radiation.

The invention relates more particularly to the combination of fluoroscopic screens and photoelectric surfaces which are so arranged as to make visible on the screens any light variations which may be incident on the photosensitive surface.

The principal object of the present invention is the provision of means for permitting the visual detection of light waves which ordinarily are not visible. The application of this device is particularly suited for the detection of infra-red radiation which may arise from a direct heat source or be the reflection from some other source such as the sun.

It is a well known fact that atmospheric fog and haze are transparent to the infra-red rays. Within recent years many photographs have been made through a dense fog, the resulting negative being surprisingly free from all traces of fog and distinctly showing objects many miles away. On one occasion a photograph was taken through three hundred miles of haze and which was accurate enough to show the curvature of the earth.

The light waves used in making these pictures were from that portion of the infra-red spectrum which lies very close to the visible region, comprising a wave length band of from 8,000 to 10,000 Angstrom units. Filters and lens systems have already been designed for this band but no satisfactory viewing arrangement has yet been devised, all results having been recorded on the photographic plate.

Thus, the principal object of the present invention is the provision of an apparatus in the nature of a telescope which will permit the operator to look through fog for a considerable distance, the device being particularly useful for ships, airplanes and like craft.

Some of the fundamental principles which govern the action of the present device are known. A photoelectric surface is mounted in an evacuated envelope and by a series of lenses and filters, infra-red radiations only are focussed on this surface. By constructive means well known to the art, the photo-sensitivity response is extended to include the infra-red radiations and an emission of electrons is obtained, the number of which is proportional to the intensity of the incident light.

By the use of a positively charged electrode these electrons are drawn away from the emitting surface, and by employing other means said electrons are caused to strike a fluorescent substance and produce a visual image. During the process the electron streams must be controlled in order to prevent same from scattering and from getting out of focus. Also the light generated by the fluorescent screen must be shielded so that it cannot shine back to the photosensitive surface and produce a permanent discharge.

A number of embodiments of the present invention are set forth in the accompanying drawings in which:

Figure 1 is a front elevation, partially broken away, of the preferred embodiment of the invention, said embodiment comprising a device wherein a minute separation of photosensitive surface and fluorescent screen is employed to avoid loss of focus;

Figure 2 is a longitudinal vertical section taken substantially through the center of another embodiment which is substantially similar to the preferred form, this second embodiment of the invention being somewhat less expensive to construct than the first embodiment;

Figure 3 is a side elevation of a conventional telescope, partially broken away, the view also showing the embodiment shown in Figure 2 in position therein.

Figure 4 is a central vertical section taken substantially through the center of another embodiment of the invention, which more nearly resembles the embodiment shown in Figure 1, this embodiment of the invention showing means for effecting a considerable separation of the photoelectric surface and the fluorescent screen, with various devices for focusing the electron streams, and for preventing the scattered electrons from reaching the screen.

Figures 5, 6 and 7 are diagrammatic representations for explaining the theory of scattered electrons and the focussing action of electrostatic fields.

Figure 8 is a perspective view of a still further modification in the construction of the device wherein a plurality of solid non-transparent fluorescent screens and photoelectric surfaces are employed and a magnetic field is used to segregate the visual rays from the photoelectric surface.

Figure 9 is a broken vertical section taken through the evacuated envelope employed in Figure 8, this view showing certain additional details of various of the elements, the supporting means for the elements not being shown in this figure nor in Figure 8.

In Figure 1, all the elements are enclosed in an evacuated transparent envelope 10. The incident rays 11 may be filtered at any point along their path by a suitable filter 12 in order that only infra-red rays are admitted to the cell. After entering the glass envelope 10 the rays pass through a glass plate 13 which is used as a supporting medium for a layer of silver 14 on its inner surface.

The light filter may be mounted inside the envelope and if suitable colored glass or quartz are employed as the filtering medium, they may be used as the supporting member for the silver film 14. Also it may be noted that cuprous oxide is a fair infra-red filter and possesses electrical conductivity which is advantageous but not necessary.

The silver deposit or layer 14 is partially oxidized by electrical means before a cesium film 15 is applied. The cesium is also oxidized and the combined films produce a photoelectric surface which is sensitive to infra-red rays. The silver film, in order to adequately perform its function, must have three characteristics. First, it must be partially transparent to the incident radiation. Second, it must be sufficiently conductive to form one electrode of the electrostatic field. Third, it must be sufficiently active chemically to aid the cesium layer 15 to form a photosensitive surface.

Silver, when deposited in a thin film has about 40% more resistance than a solid wire of the same cross section, but in this instance a high resistance is not a disadvantage because the currents used are very small and the voltage is quite high. Metallic films, when decreased in thickness, will still function as conductors until a definite minimum thickness, known as the "critical thickness" is reached, and for silver this value is $3 \times 10^{-6}$ c. m. A film of silver thinner than this has practically infinite resistance. The optimum thickness of silver as a light transmitting film is $3.2 \times 10^{-5}$ c. m. or about ten times as thick as the critical thickness, and at this thickness silver has a light transmitting value of 44% and almost complete freedom from interference effects.

The process by which silver is oxidized and then covered with a layer of cesium, which in turn is partly oxidized, is well known to the art. For clearness in the drawings, the layers of silver and cesium are indicated as having quite an appreciable thickness. It is to be understood, however, that the combined thickness of silver and cesium oxides is less than $10^{-4}$ c. m.

A fluorescent screen 17 is mounted close to the photo-sensitive surface. This screen fluoresces when hit by electrons. In view of the diverging nature of electrons and their dispersive scattering, the screen is mounted substantially one tenth of a millimeter from the cesium oxide. Since the fluorescing of this screen would immediately react on the cesium oxide, it is necessary to interpose a barrier between them which will pass electrons but exclude the light.

Such a barrier may be made of very thin light metal such as magnesium, beryllium, lithium or aluminum. The thickness need be only sufficient to stop the visible light, and a film of magnesium about $4 \times 10^{-4}$ c. m. is desirably employed. In the drawings, this film 16 is shown as being deposited in contact with the fluorescent screen 17, which in turn is attached to a glass support 18 which preserves their mechanical alignment and facilitates mounting. The glass 18 is transparent to all visible radiations and instead of being a flat plate as shown, may be the first of a series of lenses which act as an eyepiece for viewing the final image.

An additional electrode 19 in the form of a grid may be used behind the glass support 18 in order to maintain a more uniform electrostatic field and clear up the surrounding space of any stray electrons and static charges. While this additional grid is not absolutely necessary, its use will result in smoother and more dependable action. A high powered eyepiece or other lens system (not shown in Figure 1) placed close to the glass envelope 10 and focussed on the fluorescent film 17 will throw the grid 19 out of focus sufficiently so that it will not materially lower the visual efficiency.

Electrical connection is made through the envelope by means of wires through the press 21 and the stem 20. One of these wires 22, serves as a connection between the silver deposit 14 and the negative pole 27 of an external source of current (not shown).

The grid 19 is connected in the same manner by a wire 25 to the positive terminal 28 of the same current source and the magnesium film 16 by the wire 23 to an adjustable potential source 24 slideably mounted on a resistance 26.

Since the electrons emitted from the cesium oxide must pass through a considerable thickness of magnesium ($4 \times 10^{-4}$ c. m.) they must be energized with a high voltage. The structure illustrated will stand at least 5,000 volts, provided the vacuum is good and the lead in wires are well insulated from each other. Since the efficiency will be increased a marked degree by a voltage of say 200,000 volts, a tube design made specially for high voltage operation is necessary.

The structure shown in Figure 2 is particularly adapted for use with such high voltages, and its relatively simplified construction is such as to enable it to be more easily manufactured. The fundamental elements are the same as in the preferred embodiment, but the design is such that there is no unobstructed path between any part of a positively charged conductor and a negative one. Furthermore, the method of constructing this embodiment is such that some of the films may be deposited before the envelope has been finally sealed and the remaining films deposited thereafter.

The envelope 31 is tubular in shape and is provided with an enlarged portion 32 at one end thereof which extends over substantially one half its length. An end plate 33 is sealed within the smaller portion of the tube adjacent to its end. The fluorescent material 34 is then deposited on the inner surface of the end plate 33 in the form of a semi-plastic paste and is allowed to solidify. This semi-plastic paste is generally made by mixing powdered willemite and calcium sulphide with a thin nitrocellulose lacquer. As soon as the solvent has evaporated the screen is ready for the magnesium film. A small wire 35 is placed around the periphery of the end plate 33 to act as a contact with the magnesium film and this wire is joined to a lead in wire 36, said lead in wire being sealed at 37 within an integrally formed lead in tube 38 which is provided with a cap 39. Then a measured quantity of magnesium metal or one of its compounds is placed inside an iron pellet and temporarily mounted at the approximate center of the tubular envelope. The open end is then closed by any convenient means, such as affixing a plate over the opening and sealing it by wax in order that it may be readily removed. The air is then pumped out of the envelope through a vacuum exhaust tube (not shown) and the magnesium vaporized by the action of a high frequency field on the pellet, thereby depositing a film 40 of magnesium on the fluorescent screen.

The air may now be admitted and the temporarily affixed end plate removed. Any excess magnesium may be cleaned from the sides of the tubular chamber. The tube is now ready for the second electrode.

The photosensitive electrode assembly consists of a short cylindrical member 41 made of glass or quartz, having a plate 42 of the same material welded therein at one end thereof at a distance of substantially one-tenth millimeter from the edge 43.

A flexible lead-in wire 44, sealed within an integrally formed lead-in tube 45, passes through an aperture 46 in the plate 42 in order that it may be in contact with the conducting film to be deposited on the plate 42. As a means of later securing the cylinder 41 in position, two recesses 50 and 51 are cut in the adjacent walls of the envelope and the smaller portion of the tube and are filled with an easily fusible substance such as lead or tin.

Two pellets 52 and 53 are positioned in recesses 54 and 55, respectively, in the enlarged portion of the tube, said pellets being positioned at right angles to each other in the side walls of the tube 50. Each pellet is provided with external wire electrodes 56 in order that when the contents of each pellet is being evaporated, an electrostatic field may be set up to aid in the proper depositing of the film. One pellet is filled with pure silver and the other with a cesium compound.

When the assembly is completed an end plate 57 is placed adjacent to the end of the enlarged portion 32 permanently sealed therein. The tube is then thoroughly exhausted.

By manipulating the assembly properly, the small tube 41 can be moved into the larger portion of the tube 32 and positioned so that the shallow cavity is directly opposite the pellet containing the silver.

The contents of the pellet are then vaporized by means of a high frequency field and a silver film 58 is deposited on the plate 42. A small amount of oxygen is then admitted to the envelope and a discharge is created, using, as terminals, the lead-in wires 56 and 44, thus oxidizing the silver surface. Then the oxygen is removed and the plate 42 moved until it is under the other pellet containing the cesium. This time, when the cesium is vaporized by an electric field, the silver surface just deposited on plate 42 is kept at a high positive potential with respect to the cesium pellet. The electrostatic field so produced deposits the cesium atoms in a polarized manner and increases the photoelectric response for the longer infra-red radiations. Gas is again admitted to the tube and another discharge created to the cesium surface 59, oxidizing it. The tube is again pumped and sealed off after properly baking in a moderate oven.

The smaller tube 41 with the plate 42 is now moved into the position shown in the drawings and held so that the edges 43 of the cylinder rest on the magnesium film 40. A small flame is now applied to that part of the envelope on the outside of the fusible lead inserts 50 and 51. This application of heat causes the metal inserts to flow together and permanently seal the tube in place.

The assembly is now ready for use. Approximately 200,000 volts may be applied across the two terminals without the possibility of any gaseous discharge taking place. This is due to the fact that there is no path in the tube long enough to cause ionization of gas molecules. The only path which electrons may take is between the magnesium and cesium surfaces and this path is very short ($\frac{1}{10}$ m. m.) in comparison to the mean free path of the atoms when the envelope is well exhausted.

The operation of this tube is exactly the same as for the tube shown in Figure 1. Infra-red radiation is admitted through the larger end 32, passes through the plate 57 and is focussed on the film 58 and 59. Electrons are emitted and drawn to the magnesium film 40 under an electrostatic field of about 70,000 volts. The acquired speed is sufficient to make them penetrate the film 40 and fluoresce the screen behind. This fluorescence produces the visual image which is viewed through the supporting plate 33.

Figure 3 illustrates the manner in which the frequency converter may be applied to a telescope. The main casing 60 of the telescope contains an object glass 61 and a smaller barrel 62 having eyepiece lenses 63 and 64 and the light frequency converter which is indicated at 65. The element 62 is longitudinally movable in the main barrel 60, for the purpose of focussing.

Light of all wavelengths passes through the lens 61 but the infra-red filter 66 filters out all but the useful radiation. The infra-red rays pass through the first plate 57 of the converter and by means just described are converted into visible light rays which are viewed through the eyepiece aperture 67 by means of the lenses 63 and 64.

The electrical power necessary for the proper operation of this device is generated by any convenient high voltage generator. This power is connected to a suitable insulated plug (not shown) and the plug attached to the terminals 70 and 71 which are mounted on an insulated panel insert 72 on the outside of the sliding barrel 62. These terminals are suitably connected to the wires contained in the lead-in tubes 38 and 45.

Figure 4 illustrates a further modification in the construction of the invention. The photosensitive element consisting of a glass base 13', a silver film 14' and a cesium film 15' are the same as shown in Figure 1. Also the visual plate consisting of the glass mounting 18', fluorescent screen 17' and magnesium film 16' are the same as described for the first embodiment. The glass mounting 18' in Figure 4 is shown as a lens instead of a plate, to facilitate viewing, but it should be noted that either may be used in either structure depending upon the design and operation of the converter.

The design shown in Figure 4 differs from Figure 1 in that a considerable distance separates the cesium 15' and magnesium films 16'. Interposed between these surfaces are five additional electrodes, which are used to aid in the formation of a more accurate visual image on the fluorescent screen. Close to the cesium surface 15' a grid 76 is mounted parallel to the cesium plate. This grid consists of transverse members 73 which are flat thin conductors and are made of any suitable metallic conductive material. The flat surfaces of these grid members are positioned at right angles to the photosensitive surface so that any flow of electrons normal to the emitting plane will pass through the grid with a minimum of loss but any electron streams propagated at an angle to this direction will be confronted with a larger grid surface and hence be more liable to stoppage by collision.

The following four electrodes are mounted in the position shown in Figure 4. A tubular conductor 77 surrounds the photosensitive surface, a tubular conductor 78 surrounds the fluorescent screen, a screen grid 79 passes through the electron field and parallel to the photosensitive surface and lastly, another screen grid 75 is mounted a short distance (about 2 m. m.) from the magnesium film 16. It will be understood that for the sake of clearness, all conventional structural elements are omitted from Figures 1 and 4, such as the means for mounting of the electrodes.

The five intermediate electrodes 75, 76, 77, 78 and 79 are employed to produce an accurate picture on the screen 17' by eliminating the scattered electrons and condensing and speeding up the direct electrons. In order to better illustrate how this is accomplished, reference is made to Figures 5, 6 and 7.

Figure 6 shows the manner in which electrons are ejected from a photosensitive surface under various electrostatic fields, the action taking place in a well evacuated envelope.

If a light ray, indicated by the arrow 83, strikes a photosensitive surface 84 after passing through a transparent mounting 85, there will be emitted from the surface of the film 84 at the spot of incidence 86, a group of electrons. If there are no electrostatic nor electromagnetic fields present, the intensity and direction of the electrons may be represented by the envelope 87 shown in dotted lines. The full lines drawn from the point 86 to the envelope indicate the direction and speed of electron emission.

If the phenomenon takes place under the influence of a mild electrostatic field, the resulting action is shown in the next illustration wherein a light ray, indicated by the arrow 90, strikes the photosensitive surface 84 at the point 91 and results in a scattered electron beam indicated by the envelope 92. A stronger electric field will cause the electrons to acquire a much greater speed and a greater portion of them will move away in a direction normal to the emitting surface. Such a condition is shown by the indicating arrow 95 and the envelope 97. It is obvious that for the purposes indicated, the high speed electrons, normal to the emitting surface shown at 100, are the most useful and the other electrons, such as 101, shot off at an angle, contribute to a hazy and inaccurate picture on the fluorescent screen. In the design shown in Figure 4, two means are used to reduce the non-normal electron streams. First, a very high electrostatic field is employed. This should be approximately 100,000 volts which is as high as the tube will stand without danger of gaseous ionization; and second, a grid 76 as previously described is given a small positive potential of about 200 volts so that it will attract and absorb all but the swiftest and most direct electrons.

Cutting off the scattered electrons will not impair the penetrating power of the electron stream as much as might be supposed. The ability to pass through a metallic film and fluoresce a screen therebeyond depends upon the energy possessed by the electron which is proportional to the velocity squared. That is, electrons having one-half the maximum speed have only one-fourth the penetrating power.

Referring to Figure 4, the lines 102 indicate the scattered electrons gathered by the screen grid 76 and the lines 103 indicate the high velocity electrons which reach the fluorescent screen 17'.

In addition to the normal scattering action at the point of emission, electron particles also possess a natural repulsion for each other. This causes the stream to diverge and spread out even though the electrons were originally started with parallel paths.

In Figure 5 is shown a pair of conductive plates 107 and 108. If the lower plate 108 is given a positive potential with reference to the upper plate, an electrostatic field 109 will be created which will always be accelerating downwards. That is, an electron placed anywhere in said field will at once move down in the direction of the lines of force. If a spot 110 is caused to eject electrons which start toward the plate 108 with their paths of motion initially parallel to each other, they will soon spread out as shown at 111.

A means of focussing these streams is shown in Figure 7. Here the negative or zero potential electrode is not a flat plate but is shaped like a cup having a flat portion 115 and a flange 117. The positive electrode is similar with its flat receiving plate 116 and its flange 118. Midway between these electrodes is placed a screen 120 consisting of an open mesh of very fine wires. With the upper electrode at zero potential the screen is given a potential of 1500 volts and the bottom electrode a potential of only 500 volts. The dotted lines 119 indicate the lines of force of the electrostatic field and show how the side pieces 117 and 118 alter the curvature of these lines and cause their curvature to vary continuously from the outside toward the center. The field of Figure 7 also differs from that shown in Figure 5 in that it changes direction on passing the central screen 120. An electron placed at the point 123 will move down along the line of force indicated by the arrow, but an electron placed at the point 124 will move up as indicated by its arrow because the screen 120 is more positive than the lower plate 116. Therefore, electrons emitted from the plate 115 will at first encounter an accelerating field of 1500 volts and after passing the screen 120 will be in a decelerating field of 1000 volts.

The focussing action is as follows: A stream of electrons is ejected at the point 125 on the plate 115. The natural repulsion causes them to diverge as indicated by the heavy dotted lines 126. But the diverging electrons in crossing lines of force at an angle to their own direction of motion have their directions altered toward the electrostatic flow as shown by the curvature of the lines at 127. On passing the screen 120, the electrons meet decelerating lines of force, at an angle, are bent away from them instead of toward them as shown at point 130. This action has the result of bringing the electron streams to a focus at the point 131 on the plate 116.

Varying the focal distances in such an electrostatic lens may be accomplished by varying the voltages and leaving the physical structures undisturbed. A voltage varying device such as that shown, 132, will provide a focussing means by virtue of the sliding contacts 133 and 134.

This same focussing means has been applied to the tube structure shown in Figure 4. The photosensitive assembly 13', 14' and 15' is surrounded by the shield 77. The high voltage midscreen 79 gives the electrons their initial high speed and the decelerating field is caused by the shield 78 and the screen 75. It is to be noted that the screen 75 is analogous to the plate 116 of Figure 7. The plate 16 has been given a high voltage to add a short speed driving space for the electrons.

If the voltages as indicated in Figure 7 are used in Figure 4, the electrons will arrive at the grid 75 with only a speed corresponding to 500 volts. Their penetrating power would be quite low and not sufficient to traverse the magnesium plate 16 and fluoresce the screen 17 therebeyond. By adding the screen 75 and giving the plate a voltage of 3000 volts the electrons are given a velocity high enough to enable me to visualize the image on screen 17.

The visual image may be viewed through the lens 18' and 135 or any other suitable viewing system which may be used for the purpose.

Probable voltages to be applied at the conductor lead wires are indicated in the drawings, Figure 4, at the ends of the wires as they are brought out through the press seal 138 and the tube 139. It will be noticed that the focussing rings 77 and 78 are given separate lead in wires. This connection is only for five adjustments of focus and in most cases they will have the same voltage as their adjacent plates 14' and 75.

Figure 8 shows a perspective view of another embodiment of the invention. In this structure there are no transparent photoelectric surfaces and no magnesium light barriers. Segregation of visible light from the photosensitive surface is accomplished by magnetic means.

In Figure 9, the exhausted envelope 143 which contains all the light sensitive elements is mounted between two iron pole-pieces 144 and 145. These are secured to vertical portions 146 and 147 which are joined at their lower extremities to the iron bar 148. Around this latter member is wound an electromagnetic winding 149, which, when energized with direct current, will cause a strong magnetic field to be established between the pole-pieces 144 and 145. The ends of these pole-pieces are specially shaped to produce a field which possesses a definite configuration for use in the tube 143.

At the lower side of the tube, parallel to the tube axis, is positioned the photosensitive electrode 153. This is silver sheet or a copper sheet plated with silver. A layer of cesium 154 is deposited on its upper surface in the manner previously described or by any other suitable method to produce a photo-emitting surface which will eject electrons when under the influence of infra-red radiation. Connected to this plate is a lead-in conductor 155 which permits the assignment of a proper electric potential. Immediately above the plate 153 is a fine screen grid 156 of the same size as the plate and having a lead-in connection 157. This screen is given a potential of about 2000 volts positive, with respect to the plate 153, and serves to draw out electrons at a reasonable speed and let them pass through its openings to the space beyond.

A second screen 158 is mounted with its plane perpendicular to the axis of the tube in the approximate position shown in Figure 9, and is provided with a lead-in conductor 159. This screen will generally have the same potential as the first screen 156 so as to make the space between screens exert the least electrostatic influence on any electrons which are passing through it. Behind the screen 158 is mounted a plate 162 in the position shown, said plate comprising a metallic conductor with a thin layer 163 of fluorescent material on one surface thereof. This screen, as in the previously described embodiments, transforms the electron streams into visible light waves. A lead-in wire 164 provides this plate with a comparatively high voltage, for example, 5000 volts, so that the electron paths may be kept straight and uniform and a good lighting efficiency obtained.

The electron streams start from the plate 153 and are drawn up through the screen 156. The magnetic field between the pole-pieces 144 and 145, transverses the tube at right angles to the plane of the drawings in Figure 9 and its general outline is a diagonal strip which is equidistant from the two screens 156 and 158. The direction of the magnetic field is made such that the electron streams are turned through an angle of 90° and proceed toward the plate, as indicated in the drawings, in a direction normal to it.

As the electron streams pass through the screen 158, they enter an accelerating field and are speeded up so that they reach the screen 163 with considerable energy.

The magnetic field must be of the correct intensity to turn the electron streams through an angle of just 90°. Accordingly the current supply to the electromagnetic coil 149 should include a means for varying said current by small increments. The turning effect is also proportional to the speed of the electrons as they enter the magnetic field. Hence, another method of varying the angular change is to vary the voltage on the screen 156. Lowering the voltage will permit the magnetic field to exert a greater influence on the electrons and accordingly give a greater angular rotation.

A shield 165 is mounted in the position shown in the drawings, equidistant from the two plates and in such a manner as to totally shield the photosensitive surface 154 from the fluorescent screen 163. Since this screen is to act only as a light barrier, it should be made of black non-conducting material such as opaque glass or sulphur.

It will be obvious that the infra-red light is admitted in the direction of the arrow 166 and is focussed on the plate 153. The electron streams set up will travel through two electrostatic fields and one magnetic field till they strike the screen 163 and the light waves set up by them will be viewed in the direction of the arrows 167 by any suitable optical system. The lens 168 is indicated in Figure 9 to show how an optical eyepiece may be mounted.

The arrangement of elements shown in Figures 8 and 9 is the simplest that may be efficiently employed. It is to be understood that the focusing rings used in Figures 4 and 7 may be applied to this device. Also the collecting grid 76 in Figure 4 may be used in the magnetic structure.

In case a very sensitive converter is not required, it may be possible to omit the last screen 158 and allow the electrons to fluoresce the screen 163 with only the energy they receive from the initial screen 156.

What I claim is:

1. A vacuum tube including a photosensitive element for emission of electrons when illuminated by radiant energy, means for accelerating said emission of electrons, a fluorescent screen having the property of fluorescing with visible light when struck by electrons, means for shielding the photosensitive surface from the light given off by the fluorescent screen, said shielding means emitting a secondary radiation of electrons when struck by electrons emitted by said element and means for controlling the secondary radiation from said shield, so that said radiation will strike the fluorescent screen and produce an image corresponding to that formed by the incident radiation.

2. A vacuum tube including a photosensitive plate capable of emitting an electron stream under the action of infra red light, an accelerating electrode, a fluorescent screen, said plate being mounted at an angle to said screen and a barrier means interposed between said plate and said screen to interrupt the passage of light rays therebetween and a structural means for causing a transverse magnetic field to bend the electron stream emitted from said photosensitive surface around said barrier means so as to strike said fluorescent screen.

3. A vacuum tube including a photosensitive element for emission of electrons, an electrode for accelerating said emission of electrons, a fluorescent screen, barrier means positioned between said photosensitive element and said fluorescent screen and a means for controlling the electron streams emitted from the photosensitive element said means including a plurality of auxiliary electrodes lying in planes parallel to at least one of said fluorescent screen and said photosensitive element, said auxiliary electrodes forming an electrostatic field which is capable of focusing the said electron stream.

4. A vacuum tube having a photosensitive element for emission of electrons, means to accelerate said emission of electrons, a fluorescent screen so positioned as to be fluoresced by said electrons, and means interposed between said element and said screen to shield said element from fluorescent light from said screen.

5. A vacuum tube including an electron-emitting photosensitive element, a fluorescent screen so positioned as to be fluoresced by electrons emitted by said element, and an accelerating electrode interposed between said element and screen, said electrode being pervious to said electrons, impervious to light, and of a dimension sufficient that some portion thereof is between an area on said element and all parts of said screen.

6. A vacuum tube including an electron emitting photosensitive element, a fluorescent screen, and an accelerating electrode interposed between said element and said screen, said electrode being pervious to said electrons, impervious to light, and producing secondary electrons under the action of said electron stream.

7. A vacuum tube having a photosensitive electron emitting element, means to accelerate emission of electrons by said element, and a fluorescent screen positioned to be fluoresced by said emitted electrons, said means being pervious to electrons, opaque to light, and interposed between said element and screen, whereby electrons emitted by said element pass through said means with the production of a secondary radiation which fluoresces said screen.

RALPH E. BITNER.